United States Patent [19]

Drwiega

[11] Patent Number: 4,650,303
[45] Date of Patent: Mar. 17, 1987

[54] PROJECTION APPARATUS FOR PHOTOGRAPHIC TRANSPARENCIES AND A DEVICE APPARATUS FOR STORING TRANSPARENCIES TO BE PROJECTED WITH THE APPARATUS

[76] Inventor: Bohdan Drwiega, 56 Barnfield Rd., London W. 5, England

[21] Appl. No.: 708,960
[22] PCT Filed: Jul. 4, 1984
[86] PCT No.: PCT/EP84/00209
 § 371 Date: Feb. 22, 1985
 § 102(e) Date: Feb. 22, 1985
[87] PCT Pub. No.: WO85/00436
 PCT Pub. Date: Jan. 31, 1985

[30] Foreign Application Priority Data
 Jul. 4, 1983 [GB] United Kingdom ............... 8318079
 Jul. 4, 1983 [GB] United Kingdom ............... 8318081

[51] Int. Cl.⁴ ..................... G03B 23/10; G03B 21/00
[52] U.S. Cl. ........................ 353/25; 353/101; 353/109; 353/120
[58] Field of Search ............. 353/25 R, 27 R, 27 A, 353/100, 101, 108, 109, 121, 122, 120

[56] References Cited
FOREIGN PATENT DOCUMENTS

| 901705 | 11/1944 | France ........................... 353/27 R |
| 272618 | 6/1927 | United Kingdom . |
| 683973 | 12/1952 | United Kingdom . |
| 1461342 | 1/1977 | United Kingdom . |
| 1497800 | 1/1978 | United Kingdom . |
| 2047425 | 11/1980 | United Kingdom ............... 353/108 |

Primary Examiner—Harry N. Haroian
Attorney, Agent, or Firm—Scully, Scott, Murphy and Presser

[57] ABSTRACT

The subject matter of the invention is constituted by a projection apparatus for the projection of transparencies on to a screen. The transparencies are articulated together. One at a time the rows of transparencies are located between a light source and a lens, same being moved along the row of transparencies in order to project the transparencies in order on the screen. When the transparencies of one row have been projected, the chain is moved through one step in order to place the next row of transparencies in place of the former one in between the light source and the lens. The invention furthermore relates to a particularly convenient design by which a number of transparency rows may be chained together with articulating joints therebetween.

28 Claims, 22 Drawing Figures

PROJECTION APPARATUS FOR PHOTOGRAPHIC TRANSPARENCIES AND A DEVICE APPARATUS FOR STORING TRANSPARENCIES TO BE PROJECTED WITH THE APPARATUS

The present invention relates to a projector in accordance with the German Offenlegungsschrift specification No. 2,914,833 and facilities for storing photographic transparencies in accordance with the German Pat. No. 2,449,243.

The object of the present invention is to so develop the known designs that they meet present-day requirements with respect to economic production, simple operation and reliability in use in the best possible way.

The features of the invention are presented specifically in the claims, and the invention will be described in detail in the following description of the drawings. The claimed method of storing the photographic transparencies is more specially suited to the claimed projector, even although it may also be used in cases in which the projector departs from the described and claimed form in a reasonable manner. Transparencies stored in the claimed manner may be projected also for example using a projector in accordance with the above noted German Pat. No. 2,449,243.

The projection apparatus in accordance with the first working example of the invention is so designed that it is able accept strips of framed transparencies, that are connected together by articulating joints so as to form a chain, the links of such chain being formed by the articulated, framed transparencies, as is to be seen in FIGS. 18 to 24. At its two ends each strip 2a and 3a has a hole 19a, through which a pin 1 may be slipped. Such pins 1 are placed on the sides of two octagonal driving heads 2 and 3 turning on pins 4 and 5 on end plates 6 and 7, such end plates for their part being mounted on a base plate 8. The driving head 2 is able to be driven about the longitudinal axis of its pin 4 by means of a motor 9, that drives a gearwheel 10 meshing with a gearwheel 11 on the head 2. The rotation of the driving head 2 is transmitted by way of gear wheels 12 and 13 to the driving head 3, such wheels being keyed on a common shaft 14 and the gear wheel 12 cooperates with the gear wheel 11 and the gearwheel 13 cooperates with a gear wheel 15, corresponding to the gear wheel 11, of the driving head 3.

A light source 16 is slideably mounted between the heads 2 and 3 on rails 17 and 18. The motion of the light source 16 on the rails 17 and 18 between the heads 2 and 3 is produced by a lead screw 19 which is bearinged at its ends in brackets 20 and 21 on the base plate 8, and drives a lead nut 22 attached to the mount of the light source. Near its one end the lead screw 19 carries a gear wheel 23 that is driven from a gear wheel 24 on the shaft 25 of a motor 26 by way of a gear wheel 27 so that the lead screw is turned in the same direction as the motor shaft 25. The motor shaft 25 projects through the bracket 21 and the end plate 7 and is fitted with a bevel gear wheel 28 at its outer end, such gear wheel meshing with a bevel gear wheel 29 on the lower end of a shaft 30, that is mounted in bearings 31 on the outer side of the end plate 7 and at its upper end is fitted with a bevel gear wheel 32, that meshes with a bevel gear wheel 33 turning freely in the end plate 7. The bevel gear wheel 33 is made in one piece with a gear wheel 34, that meshes with the gear wheels 35 and 36, each keyed on one of two lead screws 37 and 38, whose ends fitted with the gear wheels 35 and 36 project through the end plate 7 while their other ends are bearinged in the end plate 6. The plate of the thread of the lead screw 37 is greater than the lead of the thread of the lead screw 38. On each of the lead screws 37 and 38 a respective lead nut 39 and 40 is mounted, that are attached to the upper end of the mount 41 of a lens 42. The lead nut 39 carries a pin 52 on one end of a plate 43, that is mounted on brackets 44 clear of the top face of the lens mount 41. The lead nut 40 is made in one piece with a slide 45, that is able to be moved in a horizontal plane in relation to the plate 43 in a guide 46, that is formed by the inwardly bent end of the plate 43. The slide 45 has a slot 47 through which the pin 48 projects, such pin likewise running through a slot 53 in the plate 43 and having a lead nut 49 at the lower end. The nut 49 runs on a lead screw 50 carried in bearings 44 in order to be able to change the distance between the pin 48 and the rotary pin 52.

The transparencies to be projected are mounted side by side in pockets to form rigid strips 51, marked 2a and 3a in FIGS. 18 to 24, such strips being fitted together in the desired number. The joints are placed along the long sides of the strips to connect such sides and form a chain of the separate rigid strips as will be seen in detail in FIGS. 18 to 24 showing a preferred form of the invention.

Before projection the first strip of the chain of strips is placed on one side of each of the octagonal driving heads 2 and 3, the pins 1 fitting into the holes in the two ends of the strip. In this respect the arrangement is such that the first strip hangs vertically between the light source 16 and the lens 42 of the objective and the following strips rest on the following faces of the driving heads. A stack of strips may be placed in a concertina-like folded arrangement in a first magazine and on turning the driving heads the strips will be moved out of the magazine into position between the light source and the lens whereafter the strips are placed folded concertina-wise in a receiving magazine.

Before the projector is put into operation, the lead screw 50 is so moved that the pin 48 is set in accordance with the distance of the screen from the lens 42. For such adjustment furthermore the first strip 51 is placed between the light source 16 and the lens. The motor 26 now drives the lead screws 19, 37 and 38 in order to move the light source and the lens in equal steps into positions in front and behind each transparency respectively so that the transparencies are projected on the screen one by one. While the lens mount 41 is being moved in this way along the transparencies of a row, the different driving actions of the lead screws 37 and 38 on the lead nuts 39 and 40 are responsible for a more rapid motion of the lead nut 39 than of the lead nut 40 so that the pivoting plate 43 and the mount 41 are moved in relation to the lead nuts 39 and 40 about the longitudinal axis of the pin 48 so that all transparencies of this row are projected with the same size and in the same quality on the same part of the screen. Once the light source and the lens have been moved along the transparencies in a row, the motor 9 is started in order to turn the heads 2 and 3 through one step, i.e. to move the next row of transparencies into position between the light source and the lens. After stopping the motor 9 and starting the motor 26, the light source and the lens are moved in the opposite direction to the case of the last row of transparencies along the new row thereof so that one transparency after another is projected onto the screen, the light source and the lens being moved back into their starting positions to be ready for the next operating step.

In the case of the working example to be seen in FIGS. 11 to 14 the above-noted drives with turning lead screws are replaced by cords and belt drives. In this case a cord pulley 54 is mounted on the shaft 84 of the motor 9 in order by way of a cord 56 or equivalent to drive a pulley 55 on the head 2. In a similar manner a pulley 57 is placed on one end of a shaft 58 and is driven and a pulley 59 on the other end of the shaft 58 drives a pulley on the head 3 by way of a cord 61 or equivalent. On the same lines a pulley 62 is mounted on the shaft 25 of the motor 26 and connected by way of a cord 64 with a point 63 of the lens mount 41, the cord 64 being trained around pulleys 65, 66 and 67 in the upper part of the projector and around pulleys 68 and 69 in the lower part of the projector to a fixed point 70 on the lower side of the light source 16, it then being trained about pulleys 71, 72, 73 and 74 to the motor-driven pulley 62.

Figures 15, 16:
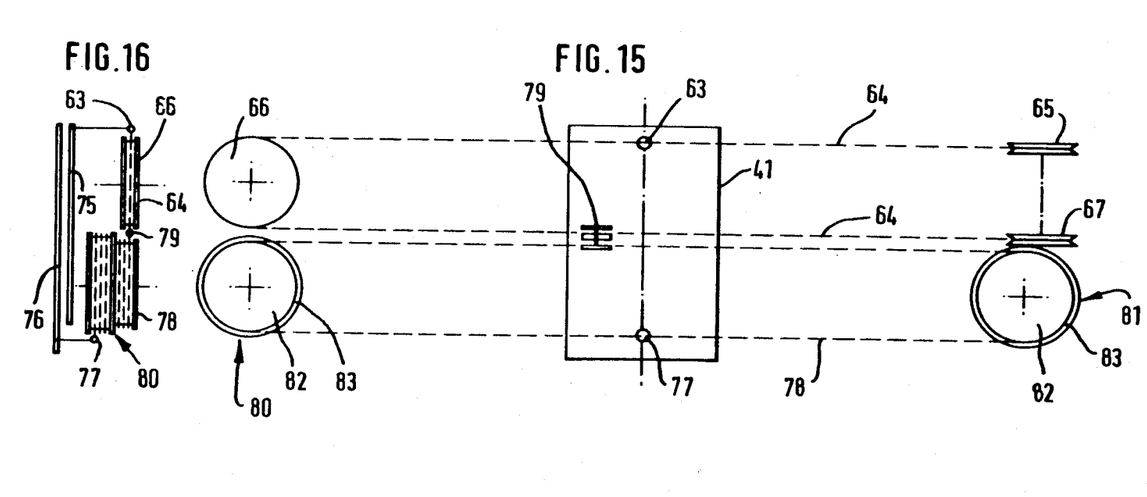
FIG. 15 is a diagrammatic plan view of the other working example of the invention to explain the cord drive of the lens mount used therewith.
FIG. 16 shows the arrangement of FIG. 15 as seen looking towards the left hand end thereof.
Figure 17:
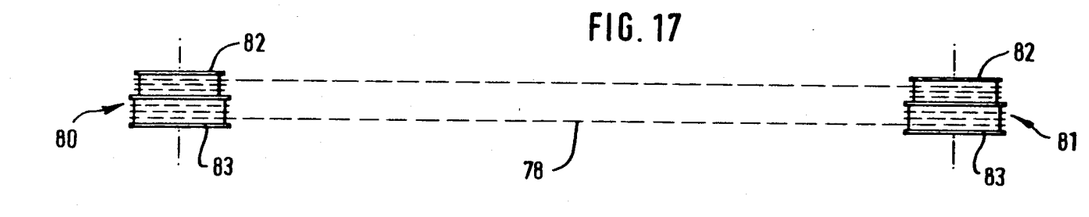
FIG. 17 is an end-on view of the arrangement to be seen in FIG. 15 to explain the cord drums present therein.
Figures 18, 19:
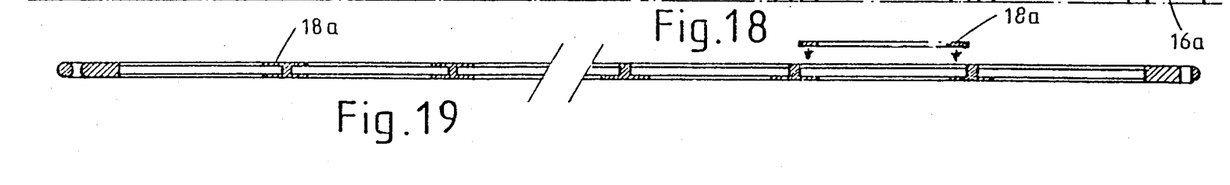
FIG. 18 shows a part of a multiple mount made up of separate strips as a device according to the invention for storing transparencies, that are to be projected with the apparatus in keeping with FIGS. 1 to 17.
FIG. 19 is a vertical section taken on the line II—II of FIG. 1.
Figure 20:
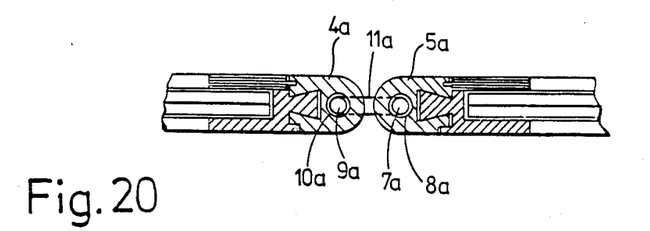
FIGS. 20 and 21 are cross sections taken on the lines III—III and IV—IV of FIG. 18.
Figure 21:
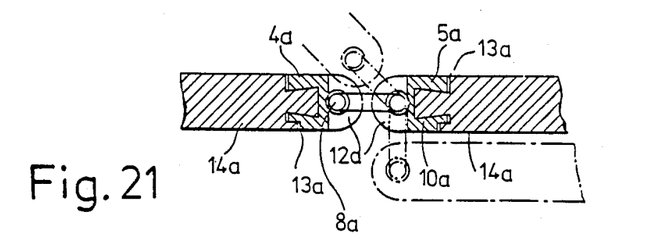
Figure 22:
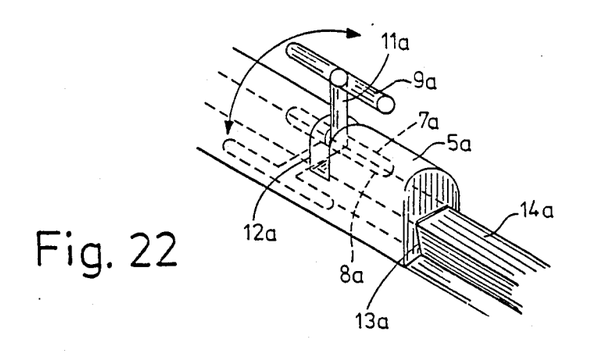
FIG. 22 shows a detail of the arrangement in the form of a joint between the adjacent long sides of two strips on a larger scale and in perspective.
Figure 23:
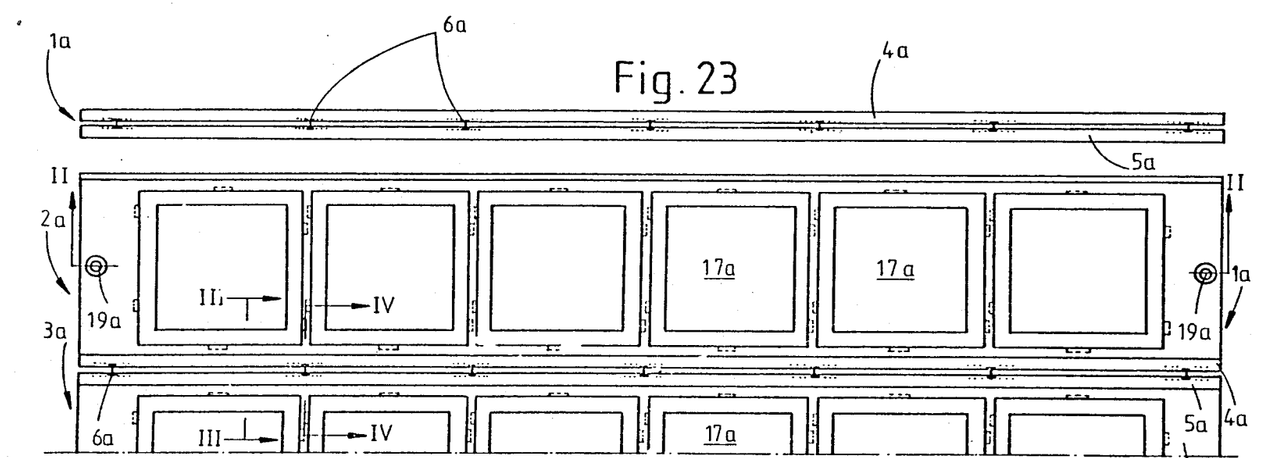
FIG. 23 is a plan view of the joint arrangement in the case of strips joined together as in FIG. 18.
Figure 24:
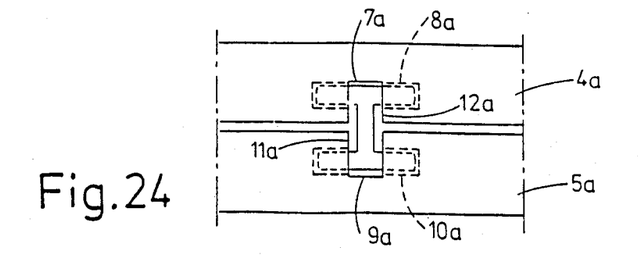
FIG. 24 is a plan view of a joint connection as in FIG. 22.

As is diagrammatically indicated in FIGS. 15 to 17, the point 63, at which the cord 64 is attracted to the lens mount, is on a plate 75, that is mounted on the top side of the lens mount and may be moved in relation thereto, as is generally the case as well with the plate 45 of the first form of the invention and a plate 76, corresponding to the plate 43, is attached to the lens mount and forms an anchoring point 77 for a further cord 78, that is drivingly connected with the cord 64 and runs between pulleys 80 and 81. Each of the pulleys 80 and 81 is provided with an upper pulley section 82, whose diameter is generally the same as that of the pulleys 65 and 66 and with a lower pulley section 83, whose diameter is greater than that of the upper pulley section. Running from its driving connection 79 with the cord 64 the cord 78 is trained around the pulley sections 82 and 83 of the pulley 80 and the sections 83 and 82 of the pulley 81 before running back to the point 79

With this arrangement, when the motor 9 is running, the cord 64 is moved in order to shift the anchoring point 63 on the plate 75 to the left in terms of FIG. 15 so that by way of the connection 79 the cord 78 is shifted in a direction in which anchoring point 77 on the plate 76 is to be shifted to the left and the difference in the diameters of the pulleys 82 and 83 causes the anchoring point 77 to be move more rapidly than the anchoring point 63, the lens mount then rocking about a vertical axis to cause motion in relation to the screen on which the transparencies are projected.

As will be seen from FIGS. 19 to 24 it will be seen that a multiple mount is made up of a number strips, of which for the sake of simplicity only two, 2a and 3a, are illustrated. Each strip has to parallel lateral members 4a and 5a. On the two adjacent longitudinal edges of the adjacent lateral members of two succeeding strips the same are hinged together by way of H-like connection elements 6a. Each connection element 6a has an arm 7a that is mounted in a pair of coaxial holes 8a in a lateral member 5c of the strip 2a so that it may pivot about its longitudinal axis. The other arm 9a of each connection element 6a is pivoted in a pair of coaxial holes 10a in the other lateral member 4a of the two strips of adjacent lateral members.

The two arms 7a and 9a of each connection element 6a are connected by a cross-piece 11a. The cross-piece is able to be adjusted in angle about the longitudinal axis of the arm 7a or of the arm 9a an in order to make this possible each cross-piece 11a projects through a pair of aligned slots 12a that extend in each lateral member 4a or 5a respectively from the edge thereof in the connection zone between the pairs of holes 8a and 10a and are in connection therewith.

Figure 1:
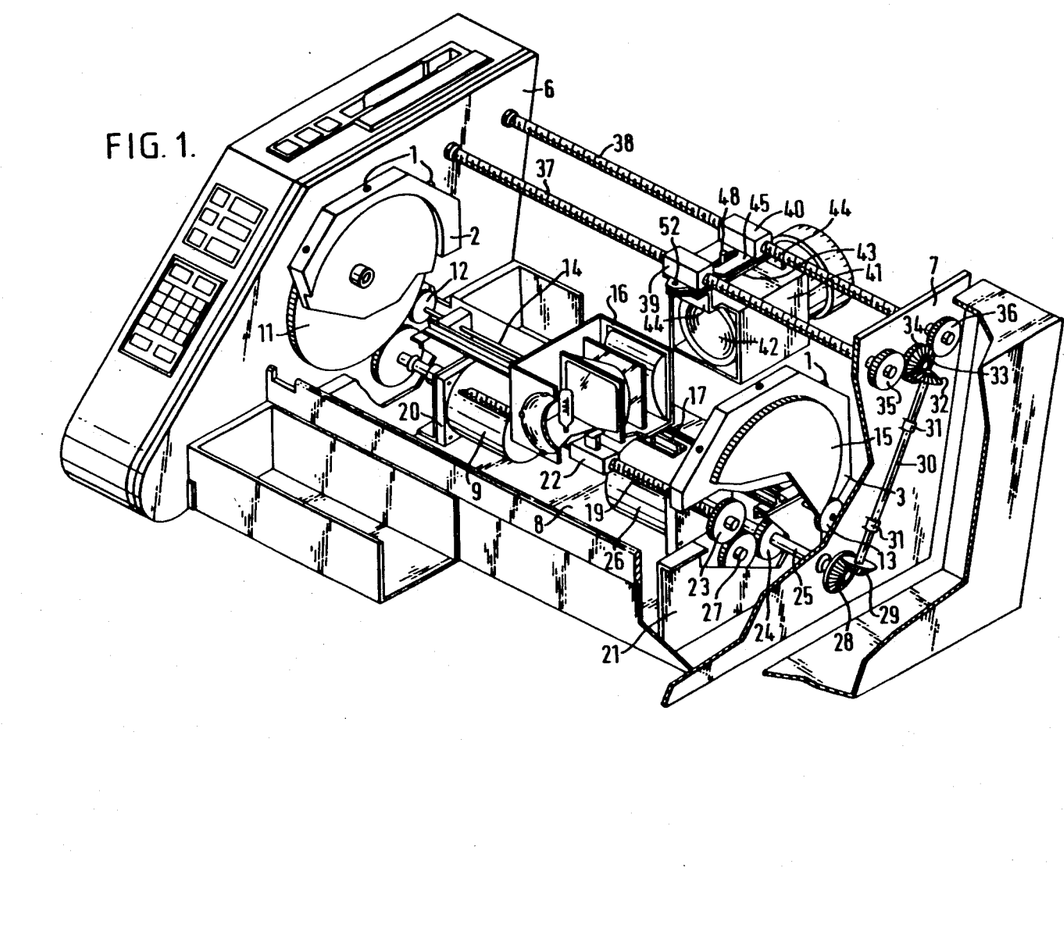
FIG. 1 is a perspective view of a projection apparatus in accordance with the invention.
Figure 2:
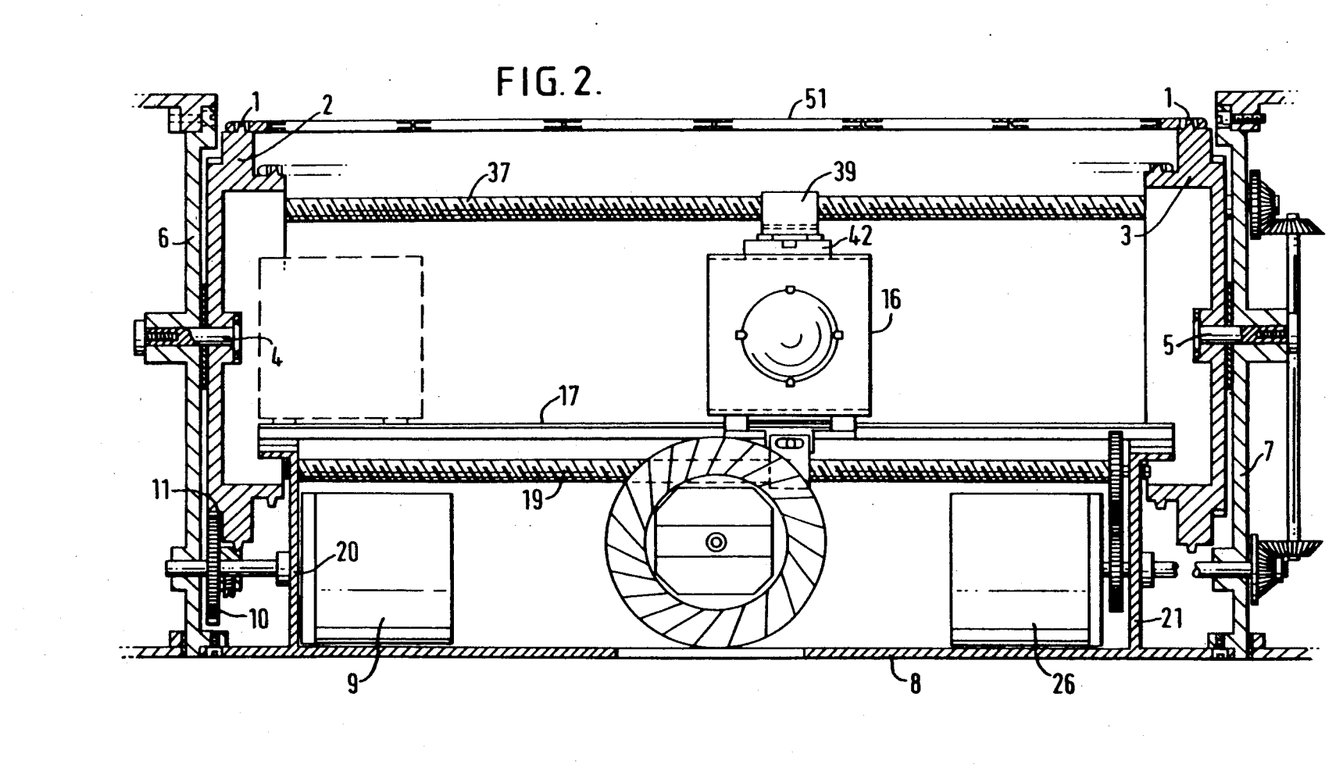
FIG. 2 shows a view of the apparatus as in FIG. 1 seen from the back and generally in section.
Figure 3:
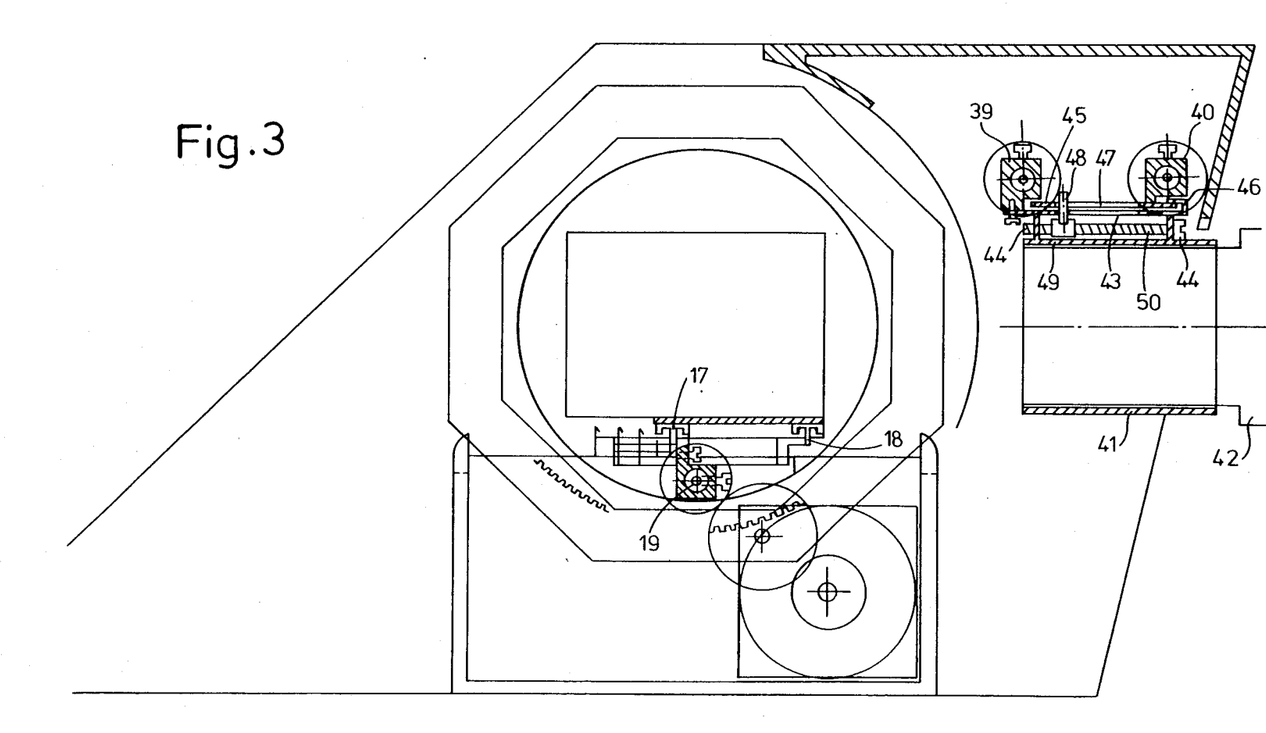
FIGS. 3 shows, generally in the form of a section, the apparatus as in FIGS. 1 and 2 looking towards the right hand side thereof.
Figure 4:
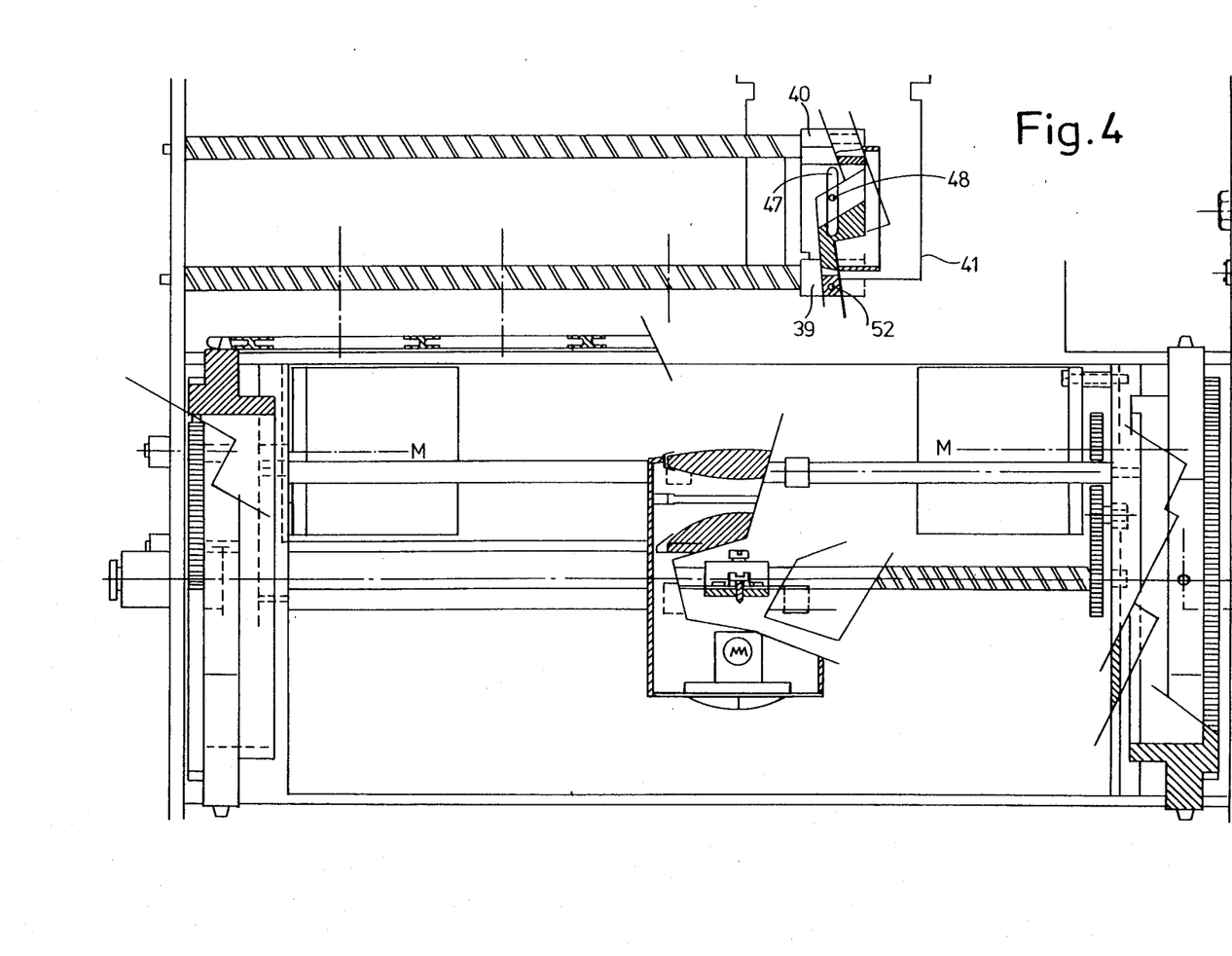
FIG. 4 is a plan view of the apparatus in keeping with the FIGS. 1 to 3, generally in section.
Figure 5:
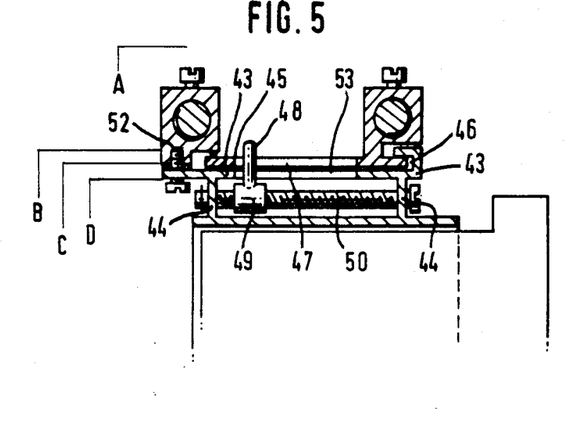
FIG. 5 is a view of the lens mount, used in the apparatus of FIGS. 1 to 4, in cross section and on a larger scale than in FIGS. 1 to 4.
Figure 6:
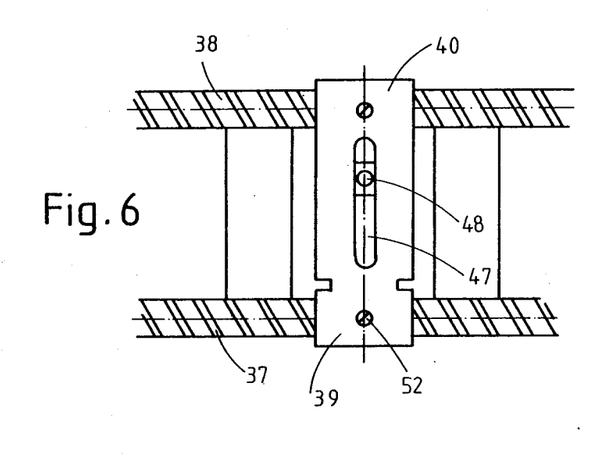
FIG. 6 is a plan view as marked A in FIG. 5 to show the arrangement in this figure.
Figure 7:
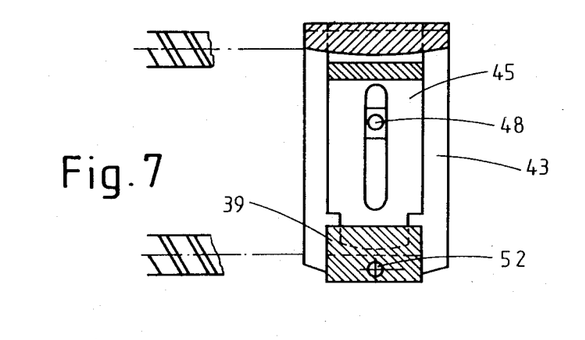
FIGS. 7 to 9 are sections as marked B, C and D in FIG. 5 of the part of the apparatus to be seen in FIG. 5.
Figure 8:
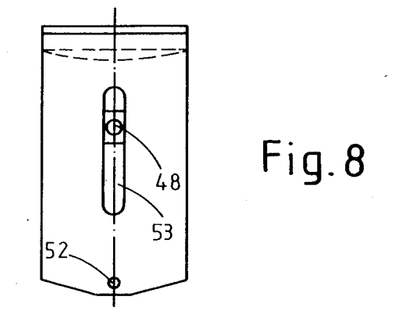
Figure 9:
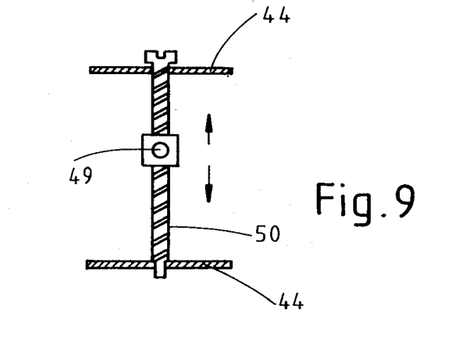
Figure 10:
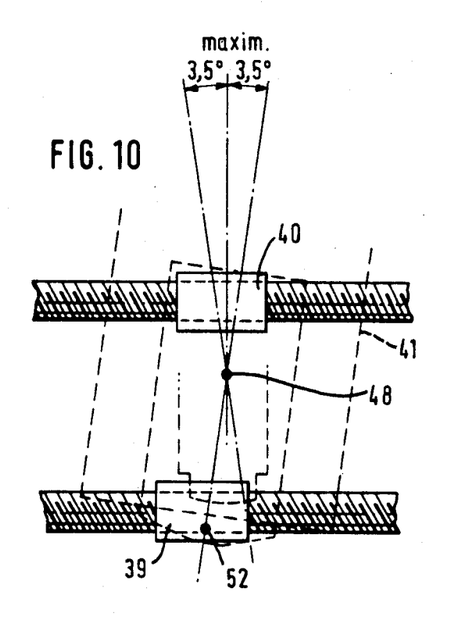
FIG. 10 is a diagrammatic plan view to make clear the manner in which the lens mount is rocked.
Figure 11:
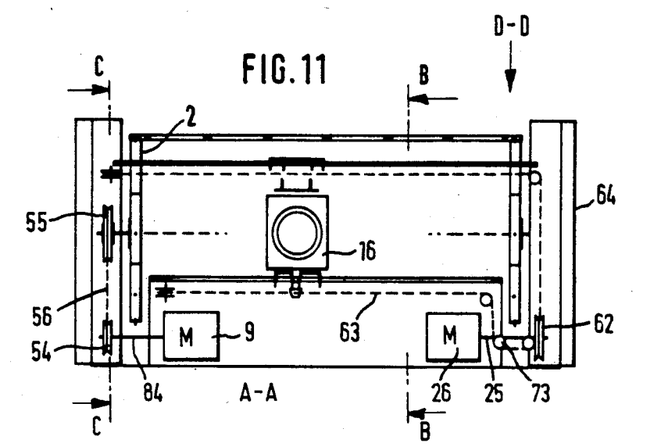
FIGS. 11 to 14 represent diagrammatic views of another form of the invention, the lines A—A, B—B C—C and D—D being employed to identify the separate views.
Figure 12:
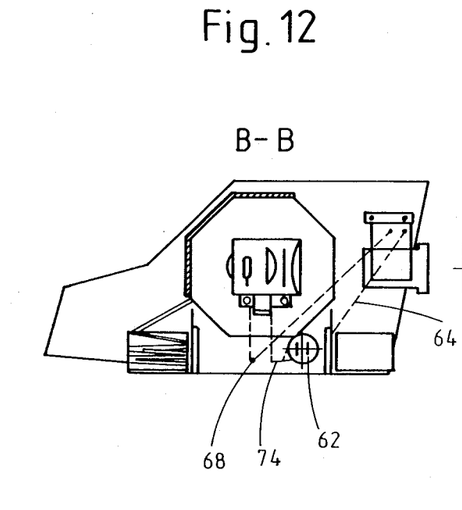
Figure 13:
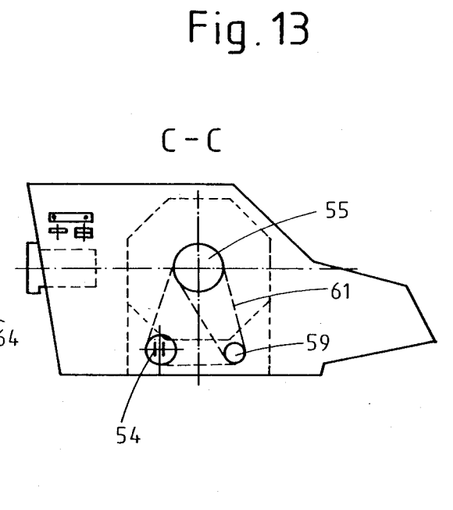
Figure 14:
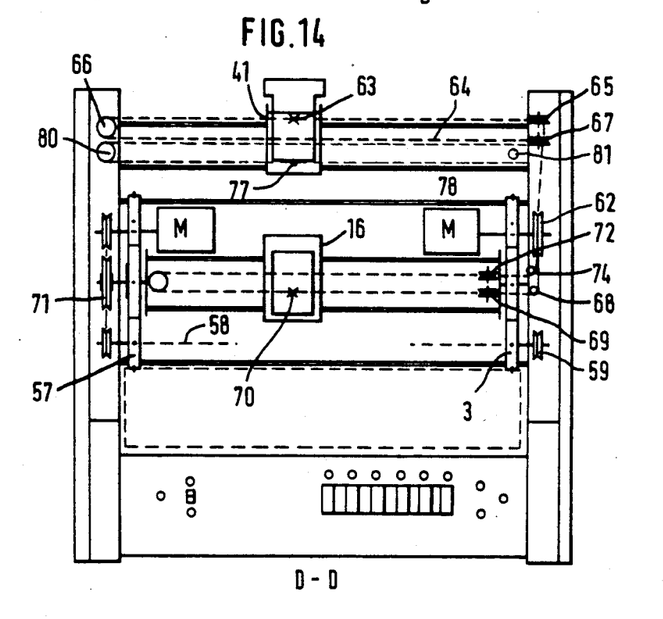

In this way the connection elements 6a make it possible for the adjacent strips 2a and 3a to be pivoted in relation to each other so that they may be folded up like a concertina or to be spread out alongside one another as parts of a multiple mount. If the strips are placed concertina-wise one on top of the other, they will be more specially be placed in one of the two magazines shown in FIG. 1. If they are taken out of the magazine placed in front of the light source and spread out, it is possible for the first strip to be placed so that the pins 1 on one side of each of the driving heads 2 and 3 are slipped into the holes 19a at the ends of a strip. If the driving heads 2 and 3 are turned the strips with the transparencies will be taken from the said magazine as noted, moved through between the lens 42 and the light source 16 and placed in the other magazine, where they are again concertina folded.

The inner faces of each of the lateral members 4a and 5a of each strip have a longitudinal dove-tail groove 13a running from end to end in which a mating projection 14a fits that is present on the longitudinal sides of the rigid strip frame, only two thereof again being shown for the sake of simplicity which are denoted 15a and 16a. It is by means of this design that it is possible for the joints with the parts 4a, 5a, 7a, 9a and 11a to be placed on the strips or to be separated therefrom. Each strip is fashioned with a series of framed apertures 17a to receive the transparencies, which are retained therein by retaining members 18a.

As a result of the form of the strips and the manner in which they are fitted together the order in which the individual transparencies are projected may be simply and rapidly changed insafar as the separate strips may be changed in position or replaced by others. On the same lines it is possible for transparencies to be changed around in their positions or to be exchanged for other transparencies.

I claim:

1. Apparatus for projecting images of transparencies onto a screen, comprising a light source on one side of the transparencies and a lens on the other side of the transparencies in front of said screen, a plurality of transparencies forming a row positioned transversely with respect to the line of projection from the light source through the lens to the screen, driving means for moving said light source and said lens in translation along said row of transparencies to project images of the transparencies sequentially onto said screen, wherein said light source and said lens are moveable, during translational motion along the row of transparencies, in relation to each other so that images of said transparencies of said row are projected with at least approximately optimum picture quality onto at least approximately the same part of said screen, said light source and said lens each being provided with an individual moving means which are driven with a defined dependency on each other by a common drive acting on said individual moving means, and said motion in translation of said lens being combined with a pivoting motion about an axis perpendicular to the direction of translational motion; wherein said lens is mounted in a lens mount which is pivotally mounted by a pivot pin, the longitudinal axis of which is perpendicular to the direction of translational movement, and said driving means for causing translational motion of said lens and of said lens mount respectively comprises two parts working in parallel in the direction extending from said light source through a transparency and said lens to said screen, which are placed in front of and behind said pivot pin for producing desired pivoting motion, and produce different speeds of motion of said lens in the direction of said translational motion.

2. The apparatus as claimed in claim 1 characterized in that said pivot pin (48) is able to be shifted positively in the direction of a projection line running from said light source (16), through said transparency and said lens (42) to said screen.

3. The apparatus as claimed in claim 2 characterized by a drive (39, 40, 43 and 45), that converts the translatory motion of drive parts (39 and 40) on the moving means (37 and 38) into pivoting motion of said lens mount (41) about the longitudinal axis of said pin (48).

4. The apparatus as claimed in claim 1 characterized in that each driving means has a guide rod (37 and 38) along which a sleeve (39 and 40) may be moved, the speed of shifting of the sleeves on said guide rods being different.

5. The apparatus as claimed in claim 4 characterized in that said guide rods are lead screws with different leads and on which the sleeves may be shifted, said sleeves being screw threaded.

6. The apparatus as claimed in claim 5 characterized in that a plate (43 and 45) has its one end attached to each threaded sleeve (39 and 40) whereas the other end of said plate is able to be adjusted in relation to the respectively other threaded sleeve in the direction of said translatory motion and in the same plane in a direction perpendicular thereto, the one plate (43) being joined to the lens mount (41) and carrying the pivot pin (48), which extends through an opening (47) in the other plate (45).

7. The apparatus as claimed in claim 6 characterized in that said pivot pin (48) is able to be adjusted in the plane of the translatory shifting motion but perpendicularly to the direction of the adjustment motion together with the plate (43) supporting same and said lens mount (41) and projects through a longitudinal slot (47) running in this direction, in the other plate (45).

8. The apparatus as claimed in claim 7 characterized in that said pivot pin (48) is fitted with a threaded sleeve (49) for producing said shifting motion, said sleeve being able to be shifted on a lead screw (50), that is supported on said lens mount (41) so that it may be turned thereon but not moved axially.

9. The apparatus as claimed in claim 8 characterized in that said light source (16) is able to be shifted on rails (16 and 17) by way of a lead screw (19) which is axially fixed and extends through a threaded sleeve (22) which is able to be shifted in the direction of the lead screw and is fixed in relation to said light source.

10. The apparatus as claimed in claim 9 characterized in that by way of spur gearing (23, 24 and 27) a drive motor (26) drives said lead screw (19) for the drive of said light source (16) and by way of bevel gearing (28, 29, 32 and 33) driven by the motor shaft (25), and spur gearing (34, 35 and 36) drives the lead screws (37 and 38) for the drive of the lens (42) and the lens mount (41) respectively.

11. The apparatus as claimed in claim 10 characterized in that both ends of the lead screw (19) for the drive of said light source (16) are bearinged in brackets (20 and 21), between which said drive motor (26) is placed, and said spur gearing (23, 24 and 27) for the drive of said lead screw (19) of said light source is placed on the inner side of a bracket (21), through which the motor shaft (25) runs in order to drive the bevel gearing (28, 29, 32 and 33) placed on the outside of this bracket.

12. The apparatus as claimed in claim 11 characterized in that said motor shaft (25) runs through one of two end plates (6 and 7), in which the lead screws (37 and 38) for the drive of said lens (42) and said lens mount (41) are bearinged, and said bevel gearing (28, 29, 32 and 33) is placed on the outside of the end plate (7), through which the motor shaft runs.

13. The apparatus as claimed in claim 12 characterized in that said bevel gearing (28, 29, 32 and 33) takes effect by way of spur gearing (35 and 36) on the lead screws (37 and 38) of the drive of said lens (42) and of said lens mount (41) respectively, that are placed outside the end plate (7) on ends of the lead screws.

14. The apparatus as claimed in claim 13 characterized in that between the end plates (6 and 7) holding means (2 and 3) for the row of transparencies are placed with a spacing that is about equal to the length of the row of transparencies.

15. The apparatus as claimed in claim 14 characterized in that said holding means (2 and 3) are pivotable in order to be able to arrange a row of transparencies clear of said light source (16) and said lens (42) for use with said holding means and to be able to put the row of transparencies by pivoting said holding means in position between said light source and said lens.

16. The apparatus as claimed in claim 15 characterized in that the holding means are polygonal turning heads (2 and 3) on whose sides, placed clear of said light source (16) and said lens (42) rows of transparencies may be placed in order, on turning the turning heads to place the rows positively and sequentially in between said light source and said lens.

17. The apparatus as claimed in claim 16 characterized in that each side of each driving head (2 and 3) has a retaining pin (1) for fitting into a corresponding hole in the ends of the rows of transparencies.

18. The apparatus as claimed in claim 17 characterized in that a number of rows of transparencies are hinged together so that on turning of the turning heads (2 and 3) a chain of rows of transparencies may be taken from a magazine in front of said light source (16) and deposited in a magazine behind said lens (42) after projection of the transparencies of a row.

19. The apparatus as claimed in claim 1 characterized in that the two parts, working in parallel, of the driving means are in the form of two cords or tapes (64 and 78), that are to be wound and unwound from cord drums (65, 66 and 83), such drums being driven at different speeds, said lens or the mount thereof being attached thereon.

20. The apparatus as claimed in claim 19 characterized in that furthermore said light source is driven by way of a cord or tape drive.

21. The apparatus as claimed in claim 20 to characterized in that said turning heads are driven by way of a cord or tape drive.

22. The apparatus as claimed in claim 18 characterized by connecting members (6') between two frame sections (2' and 3') for receiving respectively one row of transparencies each, that are distributed along the length of the longitudinal edges of the frame sections and each have the form of a letter H, and each of the parallel feet (7' and 9') is retained in one of the frame sections so as to be able to be turned about its longitudinal axis and the cross-piece (11') briges over the part between the two frame sections and in this respect is located in the slots (12') permitting the motion necessary on folding of the sections towards each other.

23. The apparatus as claimed in claim 22 characterized in that the slots (12') permit motion of the cross-pieces (11') through about 180°.

24. The apparatus as claimed in claim 23 characterized in that the feet (7' and 9') of the connecting members (6') are held in mold parts (4' and 5'), that are to be placed with grooves (13') over rails (14') of the frame sections (2' and 3') and are held thereon by a gripping effect.

25. The apparatus as claimed in claim 24 characterized in that said frame sections (2' and 3') are made in two parts, of which in each case one part has the respective rail (14') and is formed like a pocket to receive the transparencies, and the second part (18') thereof may be clamped in place after placing the transparencies in the first part to hold the adhesively fixed transparencies.

26. The apparatus as claimed in claim 25 characterized in that said first molding has as many pockets as corresponds to the number of transparencies forming a row, and the second molding (18') is made up of a number of pockets corresponding to the number of separate covers.

27. The apparatus as claimed in claim 25 characterized in that the first molding has so many pockets as corresponds to the number of transparencies in a row and said second molding (16') is also made in one piece and is to be pressed onto the first molding.

28. The apparatus as claimed in claim 27 characterized in that said second molding forms frames that respectively fit round the aperture corresponding to the size of the transparencies.

* * * * *